United States Patent
Franks et al.

[11] 4,016,543
[45] Apr. 5, 1977

[54] PROCESSOR ADDRESS RECALL SYSTEM

[75] Inventors: Theodore A. Franks, Cinnaminson; Charles L. Kapeghian, Vincentown, both of N.J.

[73] Assignee: Formation, Inc., Mt. Laurel, N.J.

[22] Filed: Feb. 10, 1975

[21] Appl. No.: 548,662

[52] U.S. Cl. .......................................... 340/172.5
[51] Int. Cl.² .................. G06F 11/00; G06F 11/06
[58] Field of Search .......... 340/172.5; 235/153 AM

[56] References Cited
UNITED STATES PATENTS

| | | | |
|---|---|---|---|
| 3,213,427 | 10/1965 | Schmitt | 340/172.5 |
| 3,461,434 | 8/1969 | Barton | 340/172.5 |
| 3,522,597 | 8/1970 | Murphy | 340/172.5 |
| 3,540,003 | 11/1970 | Murphy | 340/172.5 |
| 3,771,131 | 11/1973 | Ling | 340/172.5 |

*Primary Examiner*—Gareth D. Shaw
*Assistant Examiner*—James D. Thomas
*Attorney, Agent, or Firm*—Maleson, Kimmelman and Ratner

[57] ABSTRACT

An address recall system coupled to a processor to permit operator examination of a predetermined number of executed system addresses. A processor system address is manually inserted to the recall system. When a system address being executed compares with the operator address setting, an address equality signal is generated. The recall system logic generates either a stop or interrupt state for the processor responsive to actuation of another manually operated input switch. Addresses being executed by the processor are stored in a push down memory stack within the recall system. When an address equality signal is generated, one or more of the consecutively executed addresses contained in the memory stack may be manually displayed in the reverse order of execution.

19 Claims, 8 Drawing Figures

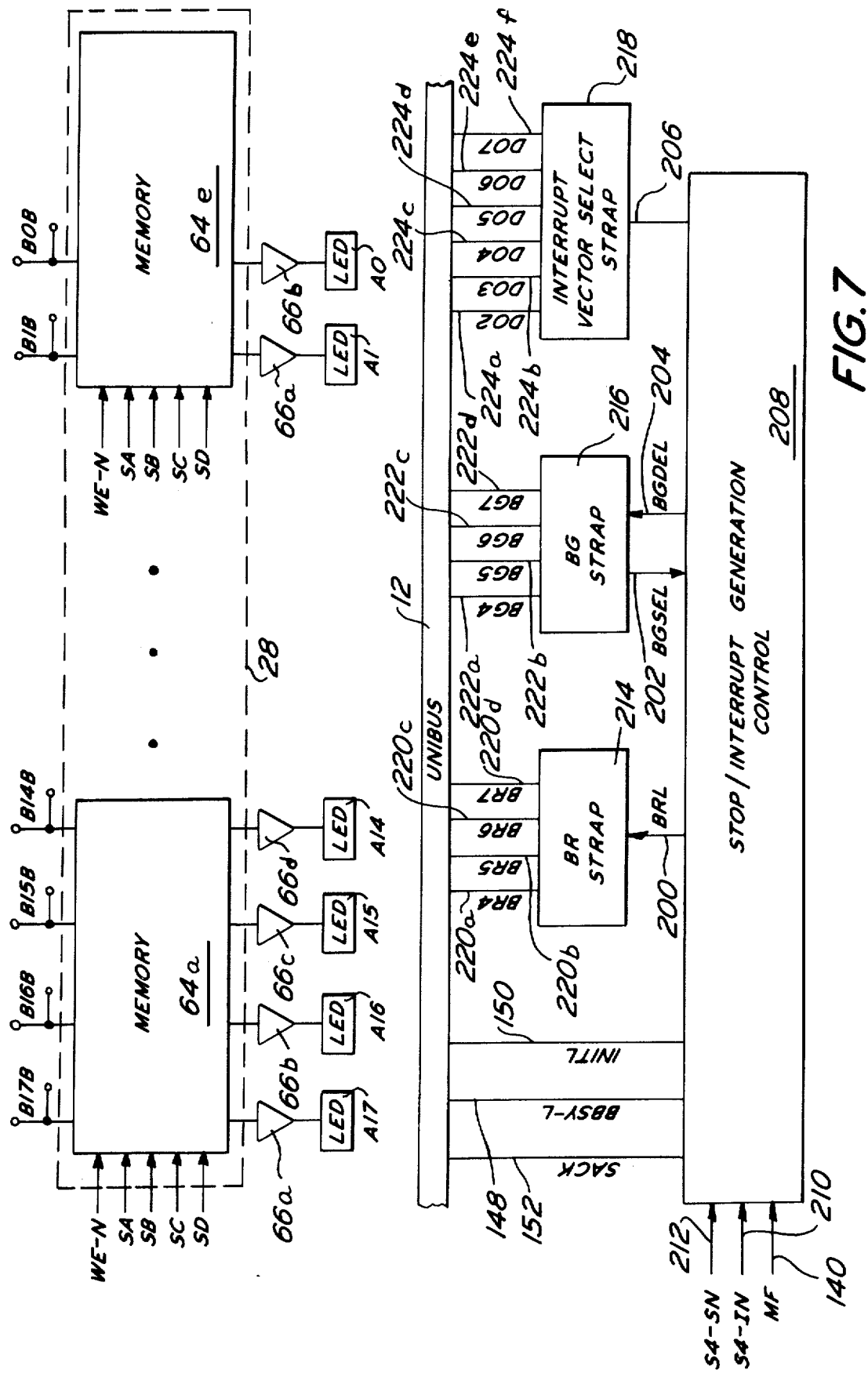

1

PROCESSOR ADDRESS RECALL SYSTEM

BACKGROUND OF THE INVENTION

A. Field of the Invention

This invention pertains to data processing systems. In particular, this invention relates to processor memory recall systems for examination of addresses being executed within the processor or its related peripheral controllers.

B. Prior Art

Systems for stopping a data processing system at a particular memory address are known in the art. However, in some prior systems, only the particular memory address location is stored within such systems and provision made for stopping the processor at the particular address. These prior systems do not permit examination of multiple memory addresses being executed in the processor system and thus, the operator is not allowed to trace the execution path of the processor system.

In some prior cases, software has been used to provide examination of several processor memory address locations. However, in this use of software the examination could not be done in a real time environment and consequently, this increased the examination time by the operator. Further, such prior software systems would not allow examination of memory addresses being executed in the processor during input-output operations by the processor systems. Utilization of prior software systems only permitted address location stopping when the processor was in control. This severely limited the memory address examination procedure to specific condition states of the processor system.

SUMMARY OF THE INVENTION

An address recall system coupled to a data processor system which includes a data processor, memory and at least one peripheral unit for detecting and retrieving a predetermined number of processor system executed memory address signals. The address recall system includes a switch mechanism for generating a first set of signals corresponding to a predetermined address within the processor system. Control logic receives address signals executed in the processor system and detects the predetermined address. A group of registers coupled to the control logic stores a predetermined number of the processor system executed address signals received by the control logic. The address recall system further includes retrieval logic for retrieving the processor system executed address signals contained in the group of registers when the predetermined address is detected in the control logic.

BRIEF DESCRIPTION OF THE DRAWINGS

FIG. 6 is a schematic logic circuit for the memory stack; and,

FIG. 7 is a schematic logic circuit diagram for the hardware control unit shown in FIG. 2.

DETAILED DESCRIPTION

Referring now to FIGS. 1–4, there is shown program debug console or address recall system 10 for creating a stop or interrupt condition in a computer processing system and permitting operator examination of the last sixteen consecutive addresses executed by the processor system. Address recall system 10 continuously saves the sixteen most recently executed system addresses in a memory entry stack which may be manually toggled by an operator and displayed by means of light emitting diodes (LED), in the reverse order of processor execution. In particular, addresses may be displayed in the reverse order of execution by depressing an appropriate toggle switch. For each address, eighteen bits of memory address location are available in the display. The retrieval and display of the addresses provides for a trace facility of processor as well as I/O activity.

Figure 2:
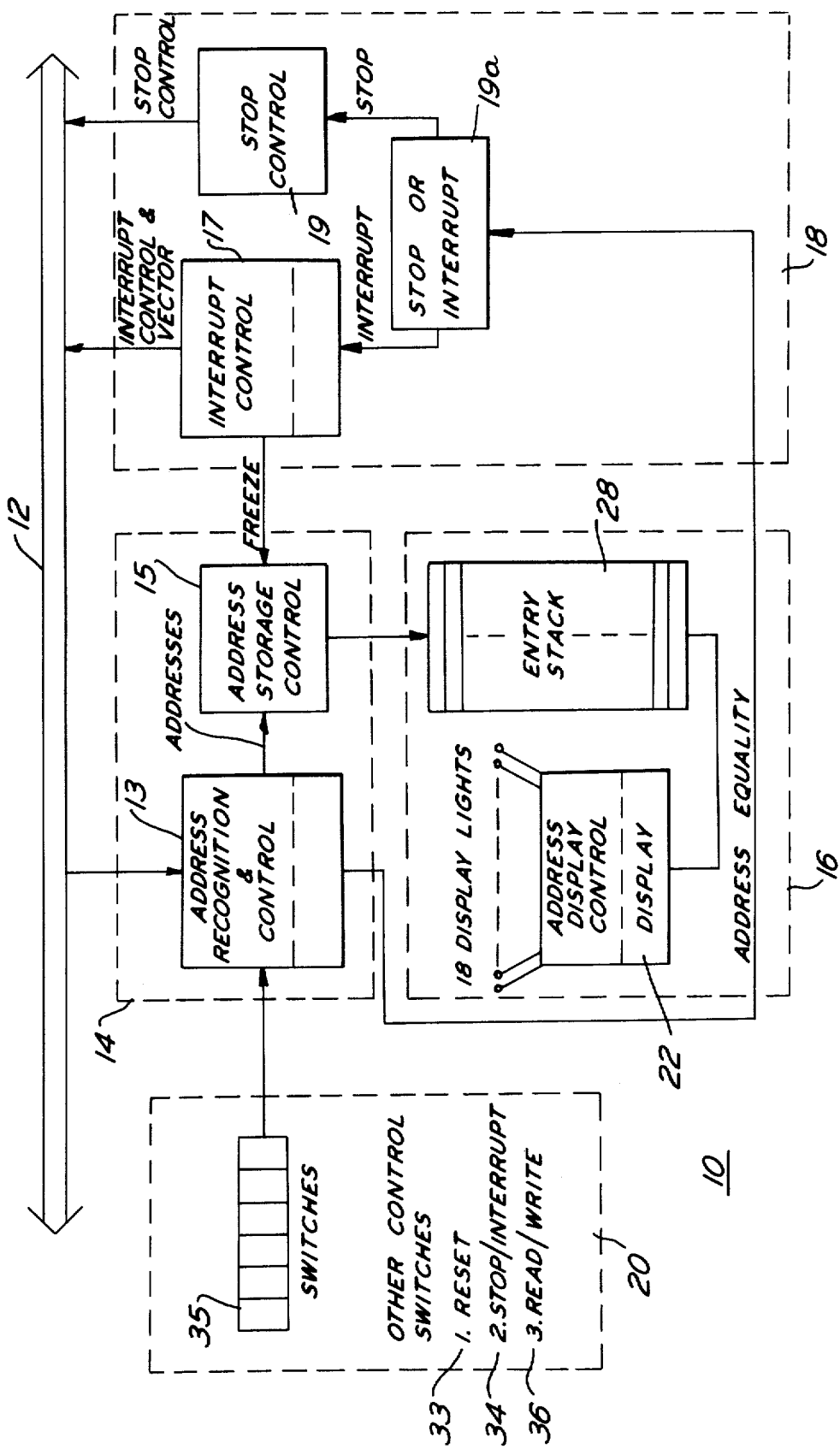
FIG. 2 is a block diagram of the address recall system showing functional coupling of the subsystem components.

Debug console system 10 as is herein described is adapted for use with PDP-11 processor system produced by Digital Equipment Corp., Maynard, Mass. However, as will be seen in following paragraphs, recall system 10 is applicable to a number of processor systems having control buses upon which memory address signals flow. In the PDP-11 processor computer system series, all computer system components as well as peripheral devices are designed to connect to and communicate with each other on a single high speed bus 12, referred to as a "Unibus" which is a trademark of Digital Equipment Corp. With bidirectional and asynchronous communications on bus 12, devices are able to send, receive, and exchange data independently without processor intervention. As is seen in FIG. 2, console 10 is connected to bus 12 in a manner similar to other system component and peripheral devices. In general, the form of communication is substantially the same for every device coupled to bus 12. The same set of signals are used between the central processing unit and main memory as is used between the peripheral devices and the central processing unit. These signals are further used when peripheral devices are communicating with the processor, memory or other peripheral devices. As is evident, each device including memory locations, processor registers, and peripheral device registers are assigned an address on bus 12. The PDP-11 processor system is described in numerous publications, one of which is "Processor Handbook PDP-11", Copyright 1971 by Digital Equipment Corporation.

In overall concept the address recall system 10 provides to the user the combination of a program debugging tool as well as a systems maintenance aid. With recall system 10, the user may provide for a processor "interrupt" state which generates an interrupt to the processor system to allow for handling by appropriate software which is not part of the inventive concept as is herein described. Additionally, with recall system 10, the user may provide for a processor "stop" state which causes immediate cessation of the processor system activity. Placing a processor system in either a "stop" or "interrupt" mode are well known in the art and in themselves are not to be construed as part of the inventive concept as is herein detailed.

As will be seen, the user may place the processor in a "stop" mode on a specified address when a (1) "write" or a (2) "read or write" is attempted. The user has the additional capability of generating an "interrupt" when the system (processor or Input/Output) accesses a specific address in (1) a "write" mode, (2) a "read or write" mode, and further (3) may stop the processor when an "interrupt" occurs. In each of these conditions, system 10 permits the display of the last sixteen addresses that were executed to provide a trace of the processor and I/0 activity.

Referring now to FIG. 2, there is shown an overall block diagram for debug console 10 connected to bus 12 which includes eighteen address and two control lines. As will be detailed, the address recall system 10 is coupled to a data processor (not shown) through control bus 12 for detecting and recalling a predetermined number of processor or Input/Output executed addresses. Console 10 is made up of four systems shown in dotted line constuction, which control the flow, interrupt, stop and memory storage of addresses passing on bus line 12.

Address control block 14 picks up addresses and control signals from bus 12. Thus, control block 14 receives addresses executed in the processor system and detects predetermined addresses inserted thereto from bus 12. As is seen, control block 14 includes address recognition and control block 13 and address storage control block 15. In overall concept, block 13 accepts addresses from bus 12 and compares them with manually set switches in block 20 to be detailed in following paragraphs. Storage control block 15 accepts addresses from block 13 and responsive to predetermined condition states, inserts the addresses into memory medium 16.

Figure 1:
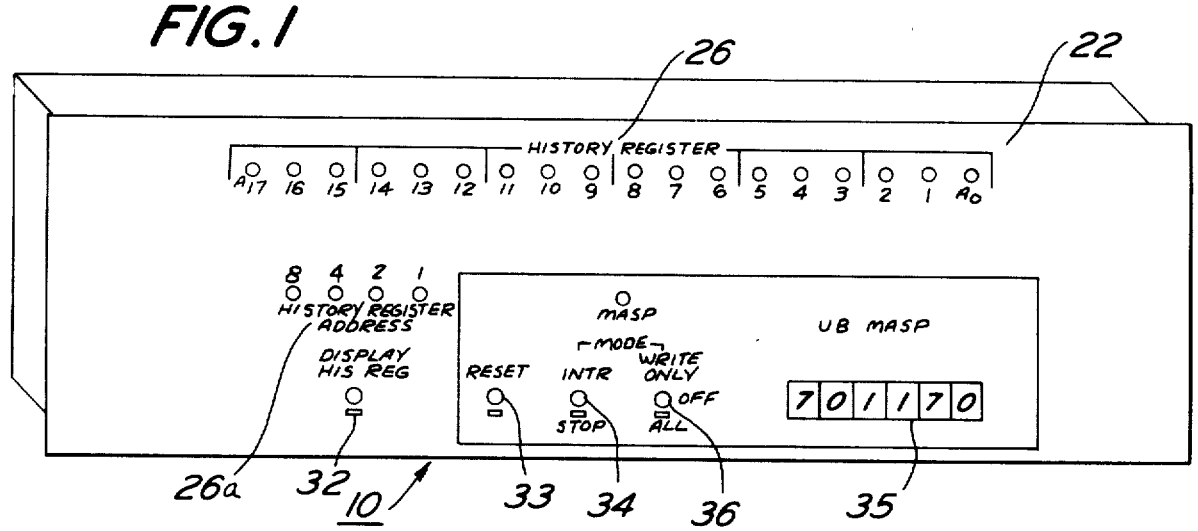
FIG. 1 is a perspective view of the address recall system.

Memory storage and display subsystem 16 accepts the incoming addresses from address control 14 and stores them in memory stack 28 as well as display them on manual command from panel 22 as shown in FIG. 1. Hardware response unit 18 is connected to control unit 14 to provide computer compatible control signals to bus 12 responsive to address recognition in system 14 or manual control from manual switch controller 20. Manual switch controller 20 is connected to address recognition and control 14 for providing manual control of operations and in particular to set the memory address in order to flag a particular address passing on bus 12.

Thus in overall concept as depicted in FIG. 2, address recall system 10 includes a set of manually operated switches within switch controller 20 for generating a first set or manually insertable set of signals to control block 14. The first set of signals correspond in part to a predetermined address within the processor or Input/Output. Control unit 14, coupled to bus 12 and controller 20, receives addresses executed in the processor system as well as the first set of signals from block 20. The address signals are inserted from unit 14 to memory storage block 16 and into memory stack 28 where a predetermined number of address signals are stored. Retrieval logic circuitry within blocks 14 and 16 allow for retrieval of the address signals contained in memory stack 28 when the predetermined address is detected in control unit 14.

Figure 3:
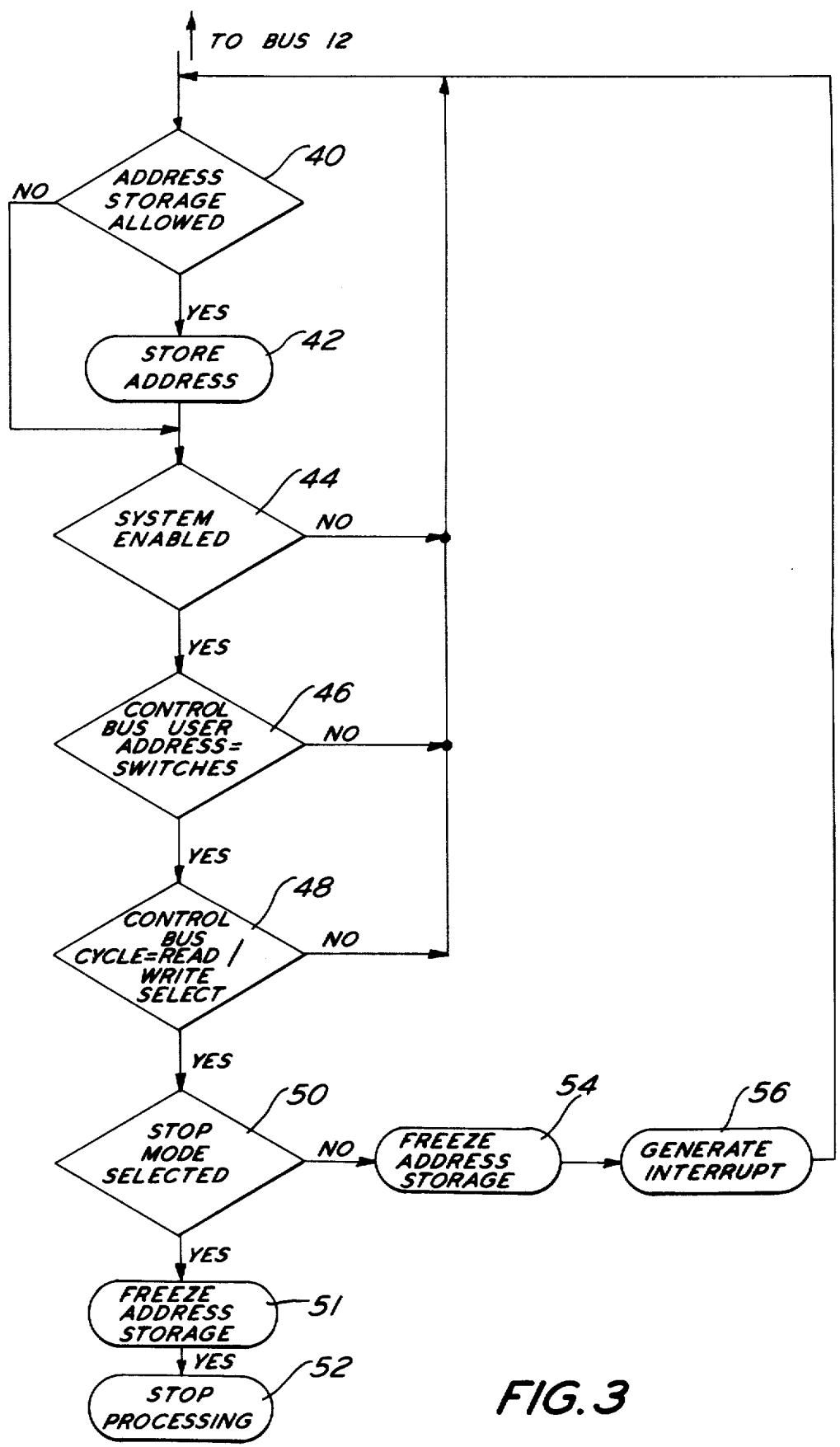
FIG. 3 is an address recall system decision flow block diagram.

FIG. 3 illustrates the decision flow chart for debug console 10. Initially, an address signal is picked up from bus 12 and inserted into decision block 40 where it is determined whether an address is to be stored. If the address is to be stored, the signal flow passes to block 42 where the address is stored in memory stack 28 of storage unit 16. If an address storage is not allowed the decision passes to block 44 where the flow chart continues. Simultaneously, the address signal from bus 12 passes to decision block 44 where it is determined whether console 10 is in an enabled position. If console 10 is not in an enabled position, the flow passes back through block 40, and the memory stack is continuously updated and the bottom of the stack is readout while retaining the most recent 16 addresses in memory stack 28. Assuming that console 10 is in an enabled position, the signal flow passes to block 46 where the control bus address is compared with the manually inserted switch display 35 on display panel 22 of FIG. 1.

If the signal address from bus 12 does not equal the console address display, the flow passes to block 40 for a cycling of the above mentioned flow sequence. Assuming that the bus 12 signal address corresponds to the inserted console 10 address, the flow then passes to block 48 where it is determined whether the address is to be selected based upon whether the processor is in the write or read mode of operation. If the address is not to be selected, the signal flow passes back to block 40 for continuation of the debugging scheme.

Assuming the address is to be selected, the flow passes to block 50 where a decision is made whether the stop or interrupt mode has been selected. If the stop mode has been selected, the information flow passes to block 51 where addresses in the memory stack are frozen and then passed onto block 52 where processng processing terminated. If the interrupt mode has been selected, then the flow passes to block 54 where address storage is frozen and interrupt is generated in block 56 and processing continues as is dictated by software in the computer processing unit. Once blocks 52 and 56 are reached in the overall flow, display history switch 32 may be toggled in order to decrement the history register display 26 for providing the last 16 addresses which have been stored.

Figure 5A:
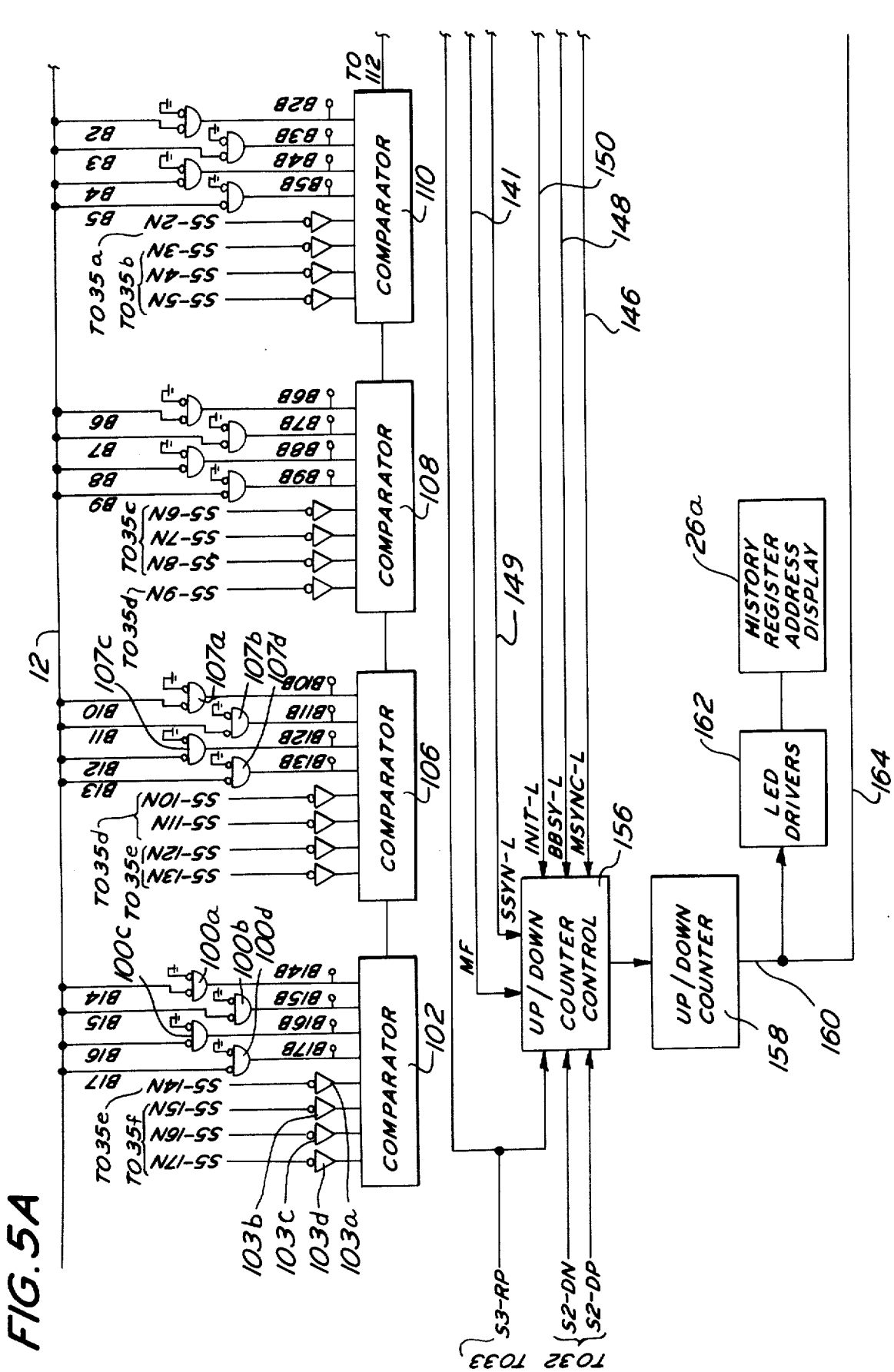
FIG. 5A and 5B are schematic logic circuits for the control and detection of address signals.
Figure 5B:
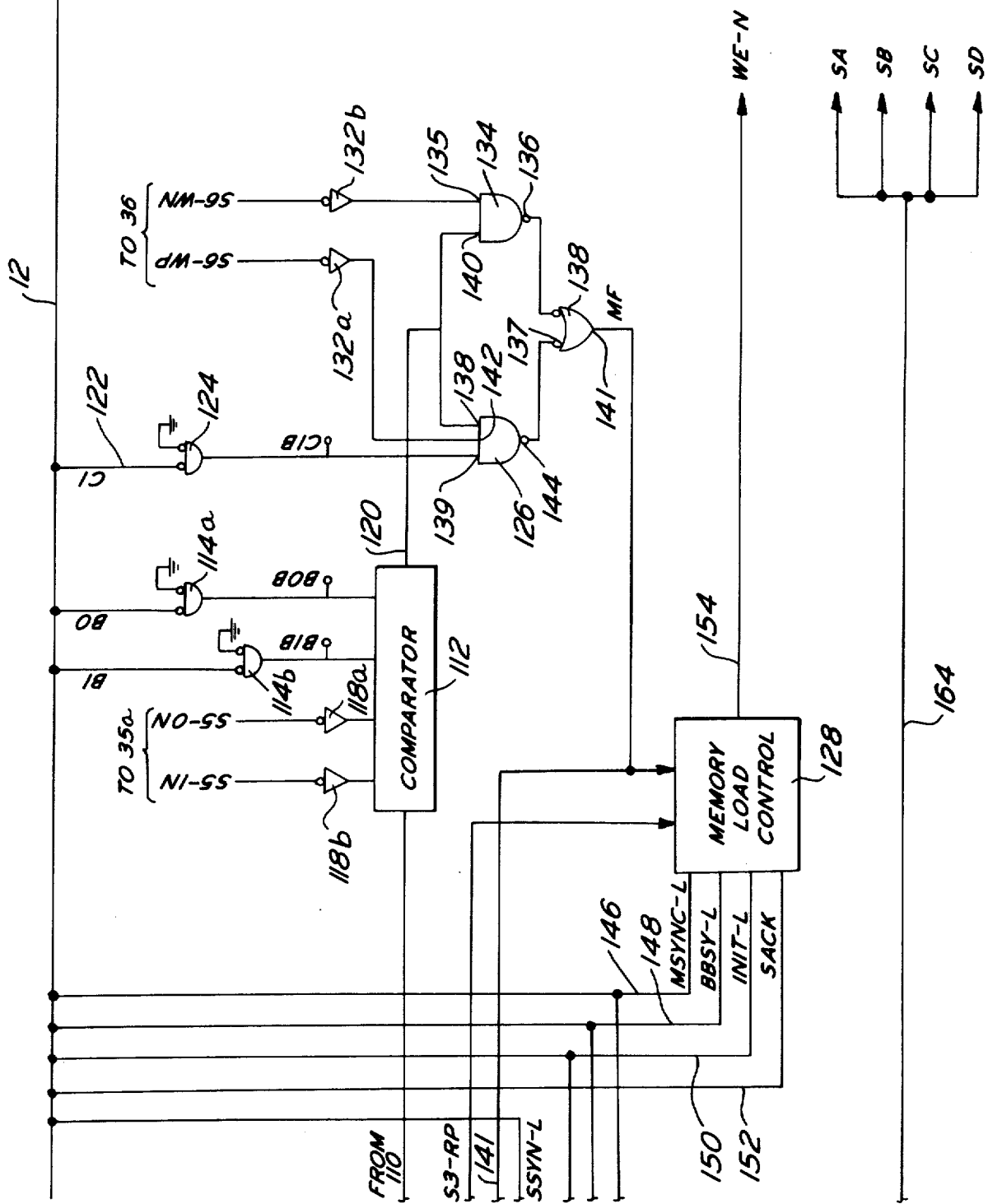

Referring now to FIG. 5A, 5B and 6, there is shown the logic circuit diagrams associated with manual switch controller 20, address recognition and control unit 14 and memory storage and display system 16 respectively. Looking now at the logic circuitry for comparing manually insertable addresses with addresses executed in the processor system, it is seen that four bits of the address are picked up from bus 12 represented by signals B14, B15, B16 and B17, and are inserted into comparator 102. This set of signal addresses passing from bus 12 represent four bits of address executed in the processor system. This set is directed through a corresponding set of buffers 100a–d to amplify the signal current prior to insertion into comparator unit 102. After amplification of the signal current in buffers 100a–d, each of the buffer output lines are tapped to provide B14B, B15B, B16B, and B17B signals. The signals are inserted into the set of memories 64a–e shown in FIG. 6 which are part of memory stack 28 of FIG. 2. At this point in the sequence, four bits of the executed system address have been taken from bus 12, passed through buffers 100a–d, and simultaneously inserted into comparator 102 and memory stack 64a.

Still referring to comparator 102 input, there is seen a simultaneous input of four bit signals S5-14N, S5-15N, S5-16N and S5-17N. This set of signals is associated with the manual settings of thumbwheel switches 35f and 35e shown in FIG. 4. The manually set thumbwheel switch signals are inserted to comparator 102 through a set of buffers 103a–d which amplify the signal current. Comparator 102 and other comparators 104, 108, 110 and 112 discussed in the following paragraphs are 4-bit digital comparators well known in the art. One example is the integrated circuit comparator SN7485 manufactured by Texas Instrument Company. In normal fashion, signals B14-B17 are compared with signals S5-14N to S5-17N respectively in a bit by bit fashion within comparator 102. As shown in FIGS. 5A and 5B, comparator 102 is connected in series with comparators 106, 108, 110 and 112.

Comparator 106 provides for comparison between signals B10-B13 and appropriate thumbwheel switch setting signals S5-10N to S5-13N set on switches 35d and 35e. As in the case of the address signals for comparator 102, the information B10, B11, B12 and B13 are passed through buffers 107a–d for amplification of the signal currents. The resulting amplified signals are inserted to comparator 106 and simultaneously passed to a memory stack by signals B10B, B11B, B12B and B13B. Additionally, comparators 108, 110 and 112 provide for respective comparison of signals set on thumbwheel switches 35a to 35d and those respective signals being brough from bus 12. Each of comparators 102, 106, 108, 110 and 112 are connected in series each to the other in order to provide a simultaneous comparison of all of the 18 bits of each address passing on bus 12 with the appropriate switch signal settings. Final comparator 112 accepts bus signals B0 and B1 passing through buffers 114a and b and compares them with the switch signals S5-ON and S5-1N passing through inverter buffers 118a and b. Switch signals S5-ON and S5-1N are inserted from thumbwheel switch 35a. If all of bus signals B0-B17 correspond to appropriate signals S5-ON to S5-17N, a coincidence, or address equality signal resulting in a high value is established on line 120 leaving comparator 112. If there is no coincidence, then a zero signal or low value is maintained on line 120.

Determination of whether a stop or interrupt of the processor system is initiated when in the "write" mode or the "read or write" mode is provided by signal C1 on control line 122 passing from bus 12 when taken in combination with signals S6-WP and S6-WN from switch 36. Write/all switch 36 is a three position switch which may be set in the "all", "write", or "off" mode. If switch 36 is in the "write" position (signal S6-WP) an address will be flagged if the processor system is operating in the "write" mode. If switch 36 is in the "all" position (signal S6-WN) an address will be flagged if the processor system is operating in the "read or write" mode. If switch 36 is in the "off" position, then console 10 is by-passed during the flow of signals from the processor and no address is flagged.

In operation, control signal C1 is passed through buffer 124 for amplification of the signal current. Signal C1 is brought through the output line of buffer 124 into NAND gate 126. Amplified signal C1, entering NAND gate 126 is used in conjuction with signals S6-WN from switch 36 to determine whether memory load control unit 128 is activated during the "write" or the "write or read" mode. Signal S6-WP corresponding to the "write" mode passes through inverter buffer 132a for amplification of the signal current. The amplified signal is then passed into NAND gate 126 at nodal point 142. Signal S6-WN enters inverter buffer 132b and is brought to a two input NAND gate 134 at node 135. The coincidence passing from comparator 112 on line 120 is brought to both of the input modes 138 and 140 of NAND gates 126 and 134 respectively.

If signal S6-WN is high and the coincidence signal from comparator 112 is also high, then output 136 of NAND gate 134 goes low. The low signal enters NOR gate 138 and goes high on output line 141. When the signals at NOR output 141 goes high, then memory load control 128 becomes activated.

Assuming that signal S6-WP is high, then such passes through inverter buffer 132a into NAND gate 126 at nodal input 142. A high signal at 142 in combination with a high signal from comparator 112 at nodal input 138 and further in combination with a high signal entering NAND gate 126 at input 139 provides a low signal at output node 144. The low signal enters NOR gate 138 at input node 137 to once again produce a high at node 141 to activate memory load control 128. If a low signal is derived from comparator 112, then the signal at node 140 is low and no activation of memory load control unit 128 is accomplished.

Memory load control device 128 is essentially a set of logic comparators which accept the high or low signal being emitted from NOR gate 138 at terminal 141 and compares such with standard bus control signals coming from the central processor unit. The signals being passed into memory load control unit 128 on lines 146, 148, 150 and 152 are signals which dictate the timing of actual address storage in the memory stack and the inhibition of continued address storage beyond the point of address comparison. Such signal generation is well known in the art and is only important to the fact that they are used in conjunction with the signal at terminal 141 to provide an output signal on line 154 (WE-N) which dictates that addresses are either to be or not to be stored within memory stack 28. When the signal passing through 154 is a low, then memory stack 28 is to be loaded with the following addresses being passed on the bus 12.

Figure 4:
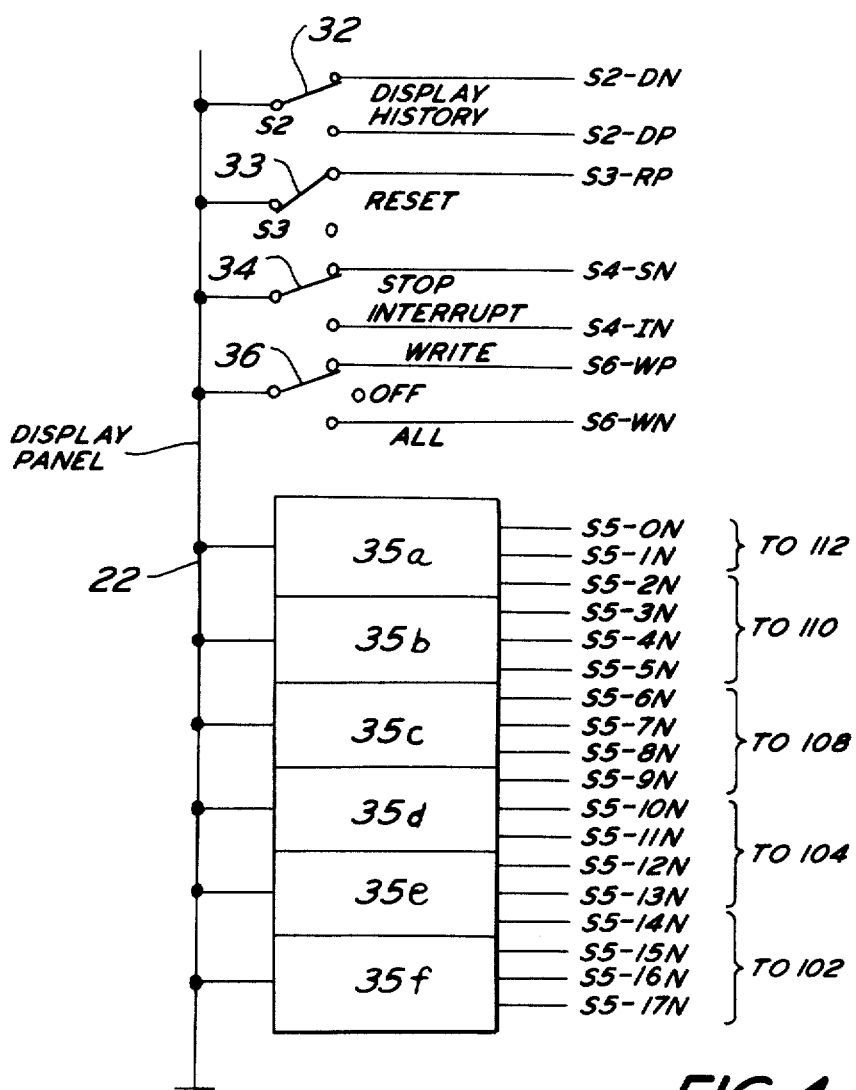
FIG. 4 is a schematic diagram of switch signals emanating from the display panel of the recall system.

It will now be seen that the same set of signals passing from node 141 and lines 146, 148 and 150 also pass to up/down counter control unit 156. The function of unit 156 is to reset, divide by sixteen, up/down counter 158 as well as to provide decrementing control for counter 158 when memory stack 28 is being read. Signal S3-RP associated with reset switch 33 shown in FIG. 4, is inserted to control unit 156 and memory load control 128 as is seen in FIG. 5A. If signal S3-RP is high, then counter 158 is reset and terminates any signals from memory load control device 128 to essentially clear the system and prepare it for a next flagging address. Signals S2-DN and S2-DP associated with toggle switch 32, actuate counter control 156 to decrement up/down counter 158 in unitary fashion in order to read the addresses stored in memory stack 28. These signals in combination with elements 156, 158 and memories 64a-64e provide for the retrieval logic circuitry to permit retrieving of address signals contained in memory stack 28.

The address now found in counter 158 passes through line 160 into a set of LED drivers 162 made up of a set of current amplifiers well known in the art. The signals are then brought to history register address display 26a shown in FIG. 1 as well as FIG. 5A. Further, the address signals from counter 158 are brought through four lines 164 resulting in signals SA, SB, SC and SD of FIG. 5B.

Referring now to FIG. 6, there is seen signals WE-N being carried on line 154 as well as signals SA, SB, SC and SD passing from up/down counter 158 on line 164. All of the signals are brought in parallel fashion to five memory elements 64a–64e. Only memories 64a and 64e are shown in FIG. 6, however, signal input is analogous in all of the memories. In combination, elements 64a–64e form memory stack 28. Memory stacks 64a–64e are generally read/write memory elements with nondestructive read out being four bits in width and 16 bits in length. A typical commercially available memory element well known in the art and the kind described herein is the integrated circuit SN 7489 manufactured by Texas Instrument Company. Signal WE-N passing on line 154 into memory stacks 64a–e is the write enable signal which enables the writing of bus addresses in the appropriate stacks. Signals SA, SB, SC and SD passing on line 164 select address locations to store the addresses within the appropriate stacks 64a–e. The address signals for each memory are the amplified signals tapped from bus 12. Thus for counter 64a, signals B14B, B15B, B16B and B17B are inserted after being tapped from inverters 100a–d shown in FIG. 5A. For each of the remaining counters four address bits are input with the exception of counter 64e having address signals BIB and BOB input thereto. Each of stacks are connected to a set of LED drivers 66a–d which amplifies the signal passing from the appropriate counter of memory stack 28. The LED drivers are connected to appropriate LED units A0-A17 on display panel 22 in history register display 26.

Referring now back to FIG. 2, there is shown interrupt control unit 17 and stop control unit 19 coupled to bus 12. Interrupt control 17 provides an additional freedom of action for the user in that when actuated, interrupt control 17 directs a signal back to the software program in the main frame of the processor to provide for processing through a particular section of the software program. In some cases, this permits the continuation of the processing of the program while allowing the user to look through a specific portion of the software program. Also included is stop control unit 19 which passes a signal back to the processor for stopping the processing sequence. Such interrupt control unit and stop control unit 17 and 19 are well known in the art and are utilized on the PDP-11 computer. Similar systems are provided for in the PDP-11 Interface Manual of Digital Equipment Corp., April, 1970.

Referring now to FIG. 7. there is shown the overall block diagram for hardware response unit 18 of FIG. 2. Included within FIG. 7 are both the schematic flow of interrupt control unit 17, stop control unit 19 and stop or interrupt unit of FIG. 2. Assuming an interrupt condition is requested from the operation panel, switch 34 of FIG. 1, signal S4-IN is actuated by switch 34 shown in FIG. 4. In this condition signal S4-IN goes low. Simultaneously, signal MF on line 140 passing from NOR gate 138 goes high. Both signals pass into interrupt generation control unit 208. Interrupt generation control unit 208, as will be seen in the following paragraphs, passes signals to control bus line 12 as well as accepting signals therefrom responsive to the appropriate setting of input lines 140, 210 and 212. Control unit 208 determines whether an interrupt condition will occur or whether a stop will be generated to line 12. Unit 208 consists of appropriate integrated circuit logic gates which are well known in the art to provide the appropriate signals to and from line 12 responsive to the aforementioned input signals. The particular circuit logic is not important to the inventive concept that is herein defined but is only important in that an appropriate response to the input signals is passed to bus 12.

Referring now back to the condition where an interrupt is requested, it has been seen that signal S4-In is placed in a low state and signal MF is placed in a high state. A bus request signal BRL is placed on line 200 by driving the signal on line 200 into a high state. Signal BRL enters BR strap 214 which sends one of the appropriate bus request signals BR4, BR5, BR6 and BR7 through lines 220a–d to bus 12. Each of strap units 214, 216 and 218 consist of a user selectable connections via binding posts to provide user options for device line addresses and priority of interrupt. Such strap units are well known in the art and not important to the inventive concept as is herein detailed. Once request is made to bus line 12 through lines 220a–d, a grant is made by the central processing unit at an appropriate time and on a corresponding line 222a–d into strap unit 216 which is transferred by signal BGSEL going high on line 202 into control unit 208. Control unit 208 acknowledges the grant by sending signal SACK on line 152 to bus 12. Signal BRL on line 200 now goes into a low state. Subsequently, signal BBSY-L on line 148 goes high as the processing system allows the program debug console to control the Unibus and the signal on line 206 goes high being passed into strap unit 218. Unit 218 is then activated to put user selected addresses on bus 12 through lines 224a–f. Up/down counter 158 in FIG. 5A is disabled in order that history register memory stacks 64a–e shown on FIG. 5B are locked until the user takes appropriate action through switch 32 to display the register contents of memory stacks 64a–e in history register address display 26 as has been described in previous paragraphs.

Assuming the user wishes to place the computer in a stop condition, signal S4-SN on line 212 is placed in a low state through actuation of switch 34 shown in FIG. 4. Signals BBSY and SSYN on lines 148 and 149 go true and addresses on line 12 are cleared. This essentially provides for a program address equal to zero and has the resulting effect of stopping all processing.

What is claimed is:

1. An address recall system coupled to a data processor system which includes a data processor, memory means and at least one peripheral unit for detecting and retrieving a predetermined number of processor system executed memory address signals, comprising:
   a. switch means for generating a first set of signals corresponding to a predetermined address within said processor system;
   b. control means for receiving address signals executed in said processor system and for detecting said predetermined address;
   c. storing means comprising a group of registers for storing a predetermined number of said processor system executed address signals received by said control means; and,
   d. means for retrieving said processor system executed address signals contained in said group of registers when said predetermined address is detected in said control means.

2. The address recall system as recited in claim 1 where said control means includes means for terminating a flow of said processor system executed address signals to said storing means when said first set of signals corresponding to said predetermined address is detected.

3. The address recall system as recited in claim 2 where said retrieving means includes means for displaying said predetermined address and prior processor system executed address signals contained in said storing means.

4. The address recall system as recited in claim 2 where said storing means includes means for maintaining said processor system executed address signals contained in said storing means independent of said processor operation mode when said flow of addresses to said storing means is terminated.

5. The address recall system as recited in claim 1 where said predetermined number of processor system executed address signals are stored in said storing means in consecutive order of execution of said processor system executed address signals in said processor.

6. The address recall system as recited in claim 1 where said group of registers includes a memory stack for maintaining said processor system executed address signals contained in said storing means.

7. The address recall system as recited in claim 6 where said storing means includes a push down memory stack for maintaining a last predetermined number of consecutively executed sets of said address signals.

8. The address recall system as recited in claim 1 where said processor system executed address signals are applied to said control means from a control bus coupled to said memory means of said processor system, said control bus carrying said address signals being executed in said processor system.

9. The address recall system as recited in claim 1 where said control means includes means for comparing said first set of signals with said processor system executed address signals.

10. The address recall system as recited in claim 9 where said control means is coupled to (1) said switch means and (2) said processor system for comparing said first set of signals with said processor system executed address signals.

11. The address recall system as recited in claim 9 where said comparing means includes means for parallel comparison of said processor system executed address signals.

12. The address recall system as recited in claim 11 where said parallel comparison means includes a set of parallel digital comparator means coupled each to the other, said set of parallel digital comparator means being connected to an address line of said processor system for comparing said address signals being executed in said processor system with said first set of signals.

13. The address recall system as recited in claim 12 where said control means includes coincidence logic means coupled to said comparator means and said address line for generating a control signal for terminating insert of said address signals to said storing means.

14. The address recall system as recited in claim 1 where said means for storing said processor system executed address signals includes counter means for reading said address signals in said storing means when a predetermined control signal is received from said control means.

15. The address recall system as recited in claim 14 where said counter means includes:
    a. counter control means responsive to said switch means and said control means; and,
    b. at least one address counter means coupled to said counter control means for addressing a predetermined memory location in said storing means.

16. The address recall system as recited in claim 1 including interrupt control means coupled to said control means and a control bus of said processor system for generating an interruption of said processor system responsive to the detection of said predetermined address by said control means.

17. The address recall system as recited in claim 1 including stop control means coupled to said control means and a control bus of said processor for terminating processor system execution of said addresses responsive to the detection of said predetermined address by said control means.

18. The address recall system as recited in claim 1 in which said retrieving means includes means for providing a binary display of the processor system executed address signals contained in the storing means.

19. The address recall system as recited in claim 1 in which said retrieving means includes means for retrieving individual ones of said processor system executed address signals contained in said storing means when said processor halts.

* * * * *